J. M. SANDERS.
Oil and Water Gas Apparatus.
No. 936.
Reissued March 27, 1860.
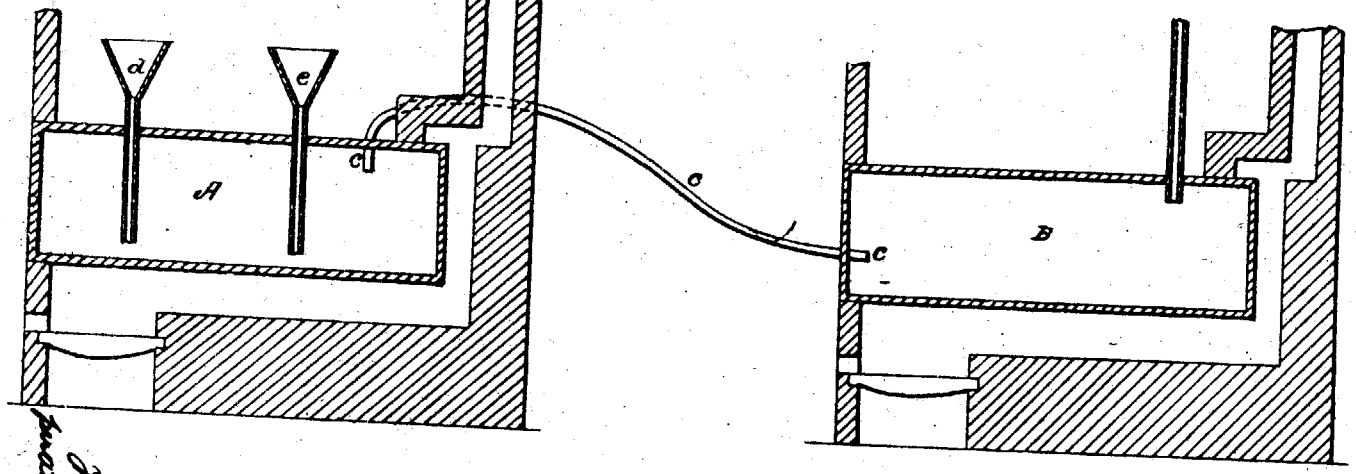
Witnesses:
S. Cohen
Rob. H. Offerman
Inventor.
J. Milton Sanders.
per atty A.B. Stoughton.

UNITED STATES PATENT OFFICE.

J. MILTON SANDERS, OF CINCINNATI, OHIO.

IMPROVEMENT IN PRODUCTION OF ILLUMINATING-GAS.

Specification forming part of Letters Patent No. 21,027, dated July 27, 1858; Reissue No. 936, dated March 27, 1860.

*To all whom it may concern:*

Be it known that I, J. MILTON SANDERS, of Cincinnati, in the county of Hamilton and State of Ohio, have invented a new and useful Improvement in the Manner of Making Illuminating-Gas; and I do hereby declare the following to be a full, clear, and exact description of the same, reference being had to the accompanying drawing, making a part of this specification, which represents in section, by way of illustrating the general principles of the invention, an apparatus by which it may be practically carried out, as will be explained more fully hereinafter.

The nature of my invention consists in making an illuminating-gas by passing the vapor of water and a hydrocarbon or its equivalent through a retort containing red hot carbon and keeping said retort at a high red heat, which produces the gas in question.

To enable others skilled in the art to make and use my invention, I will proceed to describe the same, with reference to the accompanying drawing, which is given to illustrate the process.

A is a vessel or boiler, made of sheet-iron or any other suitable metal or material, and it may be furnished with two funnels, *d* and *e*, through which water and hydrocarbon or its equivalent may be passed or poured into said boiler. Heat is then applied to the boiler until the water vaporizes, and the mixed vapor of the water and the hydrocarbon or its equivalent may be passed through the tube C into retort B.

It is not necessary, however, that the hydrocarbon or its equivalent should be mixed with the water in the boiler A, for it may be prepared in a separate vessel and be mixed with the vapor of the water at any point between the vessels which contain them and the retort or in the retort.

The retort B may contain any form of carbon—such as charcoal, coke, anthracite coal—and the retort with its contents are brought up to and kept at a high red heat.

Any hydrocarbon or its equivalent will answer the purpose to mix with the water-vapor, but I prefer those existing in large quantity—as in coal-tar—in consequence of their greater cheapness; but any other hydrocarbon or its equivalent may be used.

The passing of water-vapor over red-hot carbon has been done before by chemists, whereby they have obtained hydrogens, light carbureted hydrogen, and carbonic oxide, neither of which give any illumination. Some authors, however, say that they get the light carbureted hydrogen and carbonic acid, and therefore authors disagree in their statements of the results obtained from this process.

In my process it is difficult to say with absolute certainty what the precise action in the retort is, but of the result or product I am positively certain—viz., the procuring of a very cheap and highly illuminating gas.

Having thus fully described the nature of my invention, what I claim therein as new, and desire to secure by Letters Patent, is—

The production of an illuminating-gas by passing the vapor of water and a hydrocarbon or its equivalent, mixed previously to decomposition, into a retort containing carbon at a high red heat, substantially in the manner above set forth.

J. MILTON SANDERS.

Witnesses:
J. C. CALDWELL,
JOHN JENKINS.